June 11, 1929.  H. BECKER  1,716,999
MANEUVERING DEVICE WITH VALVE GEAR
Filed Sept. 4, 1928   2 Sheets-Sheet 1
Fig. 1.
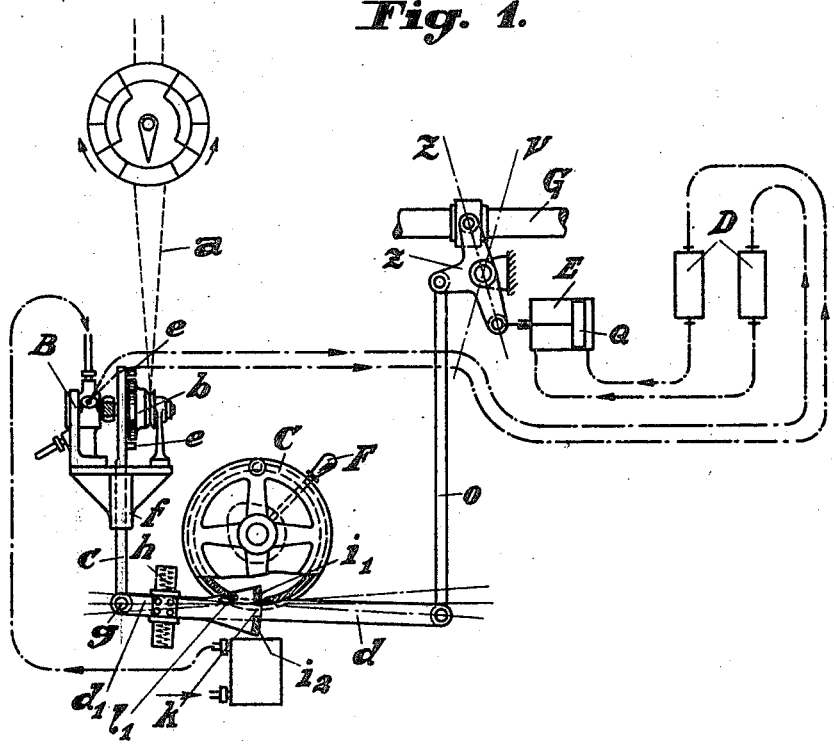
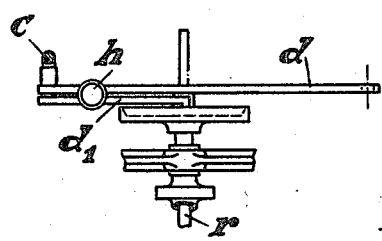
Fig. 2.

Patented June 11, 1929.

1,716,999

UNITED STATES PATENT OFFICE.

HEINRICH BECKER, OF AUGSBURG, GERMANY, ASSIGNOR TO THE FIRM MASCHINEN-FABRIK AUGSBURG-NUERNBERG, AKTIENGESELLSCHAFT, OF AUGSBURG, GERMANY, A CORPORATION OF GERMANY.

MANEUVERING DEVICE WITH VALVE GEAR.

Application filed September 4, 1928, Serial No. 303,943, and in Germany September 9, 1927.

This invention relates to control systems for the remote control of internal combustion engines.

One object of the invention is the provision of a control system for internal combustion engines, embodying a remote indicator adapted to be operated from a distance, and a manually operable control means which is so interconnected with the remote indicator as to block undesired movements of the control means.

Another object of the invention is the provision of a ship control system for Diesel engines in which the engine is controlled manually in the locality of a remote indicator which may be operated by the bridge officer of the ship, blocking means for the engine controls being provided which permits the machinist in control of the engine to reverse the direction of the rotation of the engine, supply starting-air to the engine and control the fuel supply merely by simple control movements of a control member, undesired and improper movements of which are automatically prevented.

Other objects of advantages of the invention will be apparent from the following specification and from the accompanying drawings, in which:

Fig. 1 is a schematic showing of a control system embodying the present invention.

Fig. 2 is a detailed showing of a part of the blocking mechanism.

Figure 3:
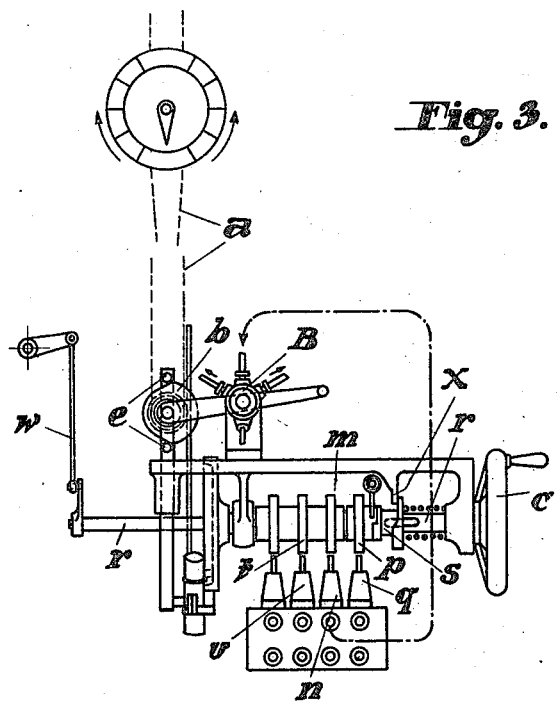
Fig. 3 is a representation of the system as viewed from the right in Fig. 1.

The invention is set forth with particular reference to a system for the control of Diesel engines of ships. In controls of this sort there is a remote indicator which is operated by the bridge officer, from a distance, this indicator showing the machinist who is in charge of the engine operation what maneuvers to carry out in the control of the engine. In accordance with prior constructions the remote indicator merely informed the machinist what to do, but in accordance with the present invention there is an interlock between the remote indicator and the control means which the machinist operates which blocks undesired and improper movements of the control means and enables the machinist to carry out the directions of the remote indicator in a simple manner and without the possibility of mistake. False reverse maneuvers are thus eliminated and the reversing, starting, and speed control of the machine is obtained in a satisfactory manner.

Referring to the drawings, the remotely controlled indicator illustrated is connected in any suitable way as by a drive-chain to a similar device located in a place convenient to the bridge officer. This remote indicator shows the machininst what changes in the engine operation are required. A drive-chain or another similar connection with the remote indicator operates a drum $b$ which is operably connected to a reversing control valve or cock B. This control valve B is in a fluid system by means of which an adjustable member G may be shifted or adjusted to effect reversal of the direction of rotation of the engine. This member or shaft G may be connected to or be a part of the engine cam shaft, which may be provided with duplicate cams for reverse or forward operation of the engine. At the proper time fluid bay be supplied through one of the pressure lines indicated in dot and dash lines leading from the control valve B to the operating oil cylinders D which in turn supply fluid pressure to one side of a cylinder E in which is a reversing piston Q. The piston Q is connected to an arm $z$ which is pivotally mounted in any suitable manner so as to effect shifting movements of the adjustable member G for the control of the direction of rotation of the engine.

A handwheel C forms a control means for controlling engine operation, and is adapted to be manually operated by the machinist. This handwheel C rotates or operates a shaft $r$ which is provided with a series of cams $m$, $p$, $t$ or other equivalent devices which operate devices such as the valves $n$, $q$, and $u$, which are provided to control the supply of reversing fluid pressure through the reversing control valve B, the control of starting-air, and the control of air injection. On the end of the shaft $r$ is a rod $w$ which controls the fuel supply to the engine.

On the drum $b$ is a cam plate, as shown in Fig. 3, and on each side of the curved peripheral surface of this cam plate are projections $e$ provided on a rod $c$ which is supported and guided for endwise movement by a guide bearing $f$. The position of this rod $c$ is therefore coordinated with the positioning of the remote indicator. The lower end of the rod $c$ is pivotally connected to a coupling arm $d$ which in turn is pivotally connected to a rod $o$ connected to the arm $z$ which adjusts the adjustable member G for reversal of the engine. The parts $c$, $d$, and $o$ form an interconnection between the drum $b$ and the adjustable member G. Alongside the coupling arm $d$ is a blocking arm $d_1$ which is pivoted at $g$, and which carries at its free end a pair of stops $i_1$ and $i_2$. Between these stops is an opening or aperture $k$. The coupling arm $d$ and the blocking arm $d_1$ are yieldingly connected by a spring coupling $h$. Stops $i_1$ and $i_2$ and the aperture $k$ are adapted to be positioned adjacent a stop-striker $l_1$, in the form of a rim or flange on the control shaft $r$. This stop-striker is not a complete circle but is broken away to form opposed ends which are shown in Fig. 1 on opposite sides of stop $i_1$. In the position of the parts shown in this figure the remote indicator is at the stop position and the rod $c$ is in its intermediate position of adjustment. From this blocked position of the control wheel C there is only one movement that the machinist can make and that is in a counter-clock-wise direction for a small movement until the stop-striker $l_1$ contacts with the stop $i_1$. During such initial movement of the control means or wheel C from its stop position the cams $p$, $n$ and $t$ on the control shaft $r$ are angularly moved, this motion causing cam $m$ to operate valve $n$, which is in the system as shown in dot and dash lines in Fig. 3 with the reverse control valve B, so that the piston Q may be operated by fluid pressure to move the adjustable member G of the engine, the reverse control valve B having been adjusted due to its mechanical interconnection as shown in Fig. 3 with the movable rod $c$. As the movement of the remote indicator sets the reverse valve B so that fluid may be supplied in the proper manner to the operating oil cylinder D, the shifting of the adjustable member G is accomplished when the machinist turns the wheel C initially from its position shown in Fig. 1.

Figure 4:
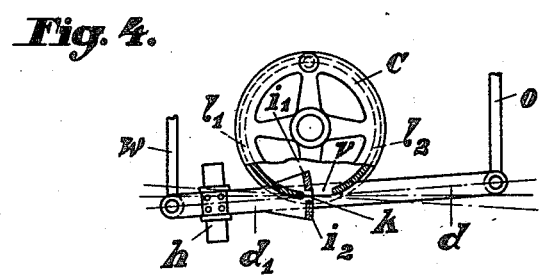
Figs. 4 and 5 are fragmentary drawings of the blocking mechanism in various positions of adjustment.
Figure 5:
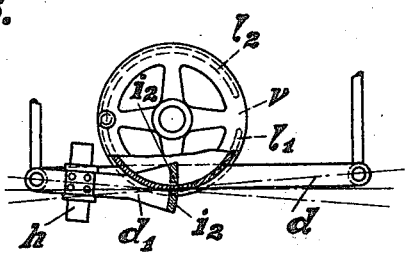

Assuming now that the remote indicator is moved so that the rod $c$ is lowered to its full extent as shown in Fig. 4. During the initial movement of the handwheel C the arm $z$ was shifted so that it assumed the position V, this movement raising the rod $o$ and raising the end of the coupling arm $d$ so that the blocking arm $d_1$, following the movements of the arm $d$, moves to the position shown in Fig. 4, which releases the block and permits a continued movement of the wheel C by the machinist, the aperture $k$ being now in line with the stop-striker $l_1$. Such continued movement of the wheel C has the following successive effects;—the rotational movement of the cam $m$ permits the return or closing movement of the valve $n$ to cut off the supply of air pressure to the reversing parts D. Then the cam $p$ operates valve $q$ to permit a flow of starting-air or other fluid under pressure to the engine and thus initially start the engine moving. After the starting-air has been supplied to the starting valves of the engine cylinders and the engine starts to move, then the cam $t$ operates valve $u$ to permit flow of air from the pressure chamber for air injection to the engine cylinders. Then, continuing the further rotation of the wheel C, fuel is supplied to the engine cylinders, this control being effected through the shaft $r$ and the connecting arm $w$ which operates the regulating member of the fuel pump for example. Upon further turning of the handwheel C, there is an automatic release of the cam $p$ from the control shaft $r$. This cam $p$ is loose on the shaft $r$ but is provided with a clutch surface as shown in Fig. 3 which is shown in engagement with a grooved clutch collar $s$. A spring operates on the cam $p$ to tend to return this cam to an initial position, and this spring pressure is overcome when the cam $p$ is clutched to the shaft $r$ and shaft $r$ is rotated. After a predetermined movement of the wheel C a release stop $x$ pushes the grooved clutch collar $s$ towards the right and releases the cam $p$ which springs back to its normal position to permit closing movement of the valve $q$ to shut off the supply of starting-air. After this the handwheel is used for regulating purposes by suitably effecting the movements of the arm.

When it is desired to stop the machine the handwheel C is rotated to the stop position. In this position the coupling $s$ is moved into the cam $p$, and the stop $i_2$ moves before the member $l_1$ and thereby blocks further continued movement of the control means. If the engine is driving forwardly and it is desired to drive reversely, then the bridge officer indicates "backwards" on the remote control, and thus moves the reverse valve B. The arm $c$ is thus elevated to its upper position, and the stop member $i_1$ rides along the surface of the member $l_1$ until the machinist has moved the handwheel into stop position. Then the stop of the blocking arm $d_1$ moves between the stop-striker $l_1$ and $l_2$ by reason of the spring coupling $h$. By turning the handwheel C until the stop is reached the flow of reversing-air to the control cylinders D and E is effected, the block is rendered ineffective automatically, and the starting and running operations are carried out in the manner described above.

Sometimes it is necessary to supply starting-air to the engine to increase the speed of rotation under certain conditions even though the engine is in operation. The cam $p$ is therefore adapted to be manually controlled independently of the handwheel C, this cam being connected to a control lever F accessible for manual operation. Starting-air can thus be supplied to the machine under emergency conditions such as where there is danger of collision.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control system for engines of the class described comprising a remote indicator adapted to be operated from a distance, an engine control means adapted for manual operation to control engine operation, and mechanism for controlling the movements of said means in accordance with the movements of the remote indicator.

2. A control system for engines of the class described comprising a remote indicator adapted to be operated from a distance, engine control means adapted for manual operation to control engine operation, and blocking mechanism for automatically controlling the movements of said means in accordance with the movements of the remote indicator.

3. A control system for engines of the class described for ships comprising a remote indicator adapted to be operated from a distance, engine control means adapted for manual operation to control engine operation, blocking mechanism for blocking undesired movements of said means, and an operating interconnection from said blocking mechanism to said remote indicator.

4. A control system for engines of the class described for ships comprising a remote indicator adapted to be operated from a distance, engine control means adapted for manual operation to control engine operation, blocking mechanism operably connected to said remote indicator for blocking said control means substantially in the stop position, and mechanism operated by initial movements of said control means from its stop position to render said blocking mechanism ineffective.

5. A control system for engines of the class described for ships comprising a remote indicator adapted to be operated from a distance, an adjustable member for controlling the direction of rotation of the engine, a system including a control valve for operating said adjustable member, and a connection between said control valve and said remote indicator for controlling valve adjustment in accordance with the positioning of said remote indicator.

6. A control system for engines of the class described for ships comprising a remote indicator adapted to be operated from a distance, an adjustable member for controlling the direction of rotation of the engine, a system including a control valve for operating said adjustable member, a connection between said control valve and said remote indicator for controlling valve adjustment in accordance with the positioning of said remote indicator, an engine control means adapted for manual operation to control engine operation, and blocking mechanism operably connected to said remote indicator for blocking undesired movements of said control means.

7. A control system for engines of the class described for ships comprising a remote indicator adapted to be operated from a distance, an adjustable member for controlling the direction of rotation of the engine, a system including a control valve for operating said adjustable member, a connection between said control valve and said remote indicator for controlling valve adjustment in accordance with the positioning of said remote indicator, an engine control means adapted for manual operation to control engine operation, and blocking mechanism operably connected to said remote indicator for blocking undesired movements of said control means, said control means having provision for rendering said blocking mechanism ineffective when the control means is moved in the manner directed by the remote indicator.

8. A control system for engines of the class described for ships comprising a remote indicator adapted to be operated from a distance, an engine control means adapted for manual operation to control engine operation, blocking mechanism operated by said remote indicator for limiting and preventing undesired movements of said control means, an adjustable member for controlling the direction of operation of said engine, and means connected to said adjustable member for rendering said blocking means ineffective.

9. A control system for engines of the class described for ships comprising a remote indicator adapted to be operated from a distance, an engine control means adapted for manual operation to control engine operation, blocking mechanism operated by said remote indicator for limiting and preventing undesired movements of said control means, an adjustable member for controlling the direction of operation of said engine, means connected to said adjustable member for rendering said blocking means ineffective, a fluid valve controlling adjusting movements of said adjustable member, and a connection from said remote indicator for properly setting said fluid valve.

10. A control system for engines of the class described for ships comprising a remote indicator adapted to be operated from a distance, an engine control means adapted for manual operation to control engine operation, an adjustable member for controlling the direction of engine operation, means for operating said adjustable member including a valve, a connection from said valve to said remote indicator, a connection from said remote indicator to said adjustable member, blocking means for blocking undesired movements of said control means, and spring means interconnecting said blocking means and said last named connection.

11. A control system for engines of the class described for ships comprising a remote indicator adapted to be operated from a distance, an adjustable member for reversing the direction of engine operation, an engine control means adapted for manual operation and having provisions for governing said adjustable member, the starting-air, and the fuel supply to the engine, all by a single maneuvering of said control means, and means coordinating the movements of said control means in accordance with the position of said remote indicator.

12. A control system for engines of the class described for ships comprising a remote indicator adapted to be operated from a distance, an engine control means adapted for manual operation to control engine operation and having provision for controlling the flow of engine starting-air, means for automatically disassociating said provision from said control means after the engine has been started, and mechanism coordinating the movements of said control means in accordance with the movements of said remote indicator.

13. A control system for engines of the class described for ships comprising a remote indicator adapted to be operated from a distance, an engine control means adapted for manual operation to control engine operation and having provision for controlling the flow of engine starting-air, means for automatically disassociating said provision from said control means after the engine has been started, mechanism coordinating the movements of said control means in accordance with the movements of said remote indicator, and means for manually controlling said provision when desired.

In testimony whereof I have affixed my signature.

HEINRICH BECKER.